Patented Aug. 5, 1952

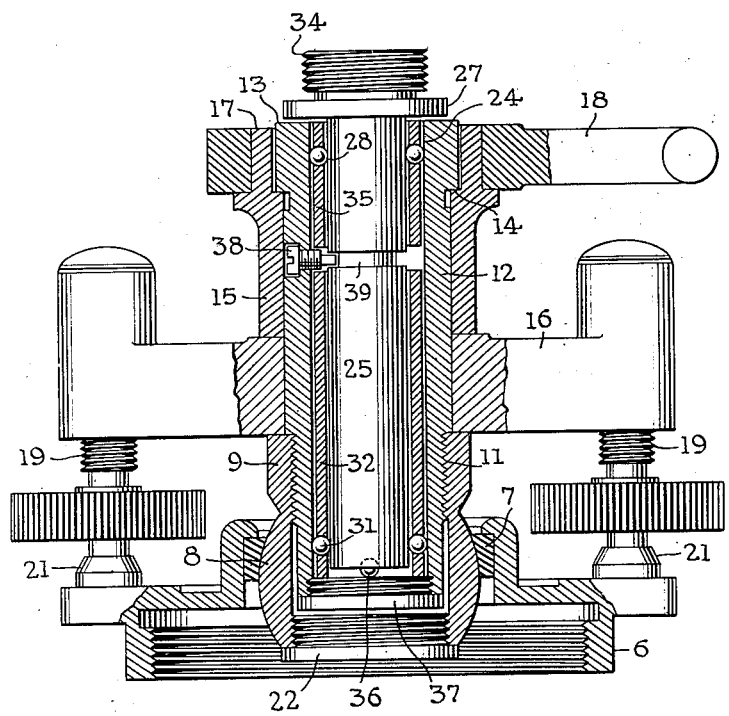

2,606,084

UNITED STATES PATENT OFFICE 2,606,084

SPINDLE BEARING FOR SURVEYING INSTRUMENTS

Harold R. Larsen, Troy, and Daniel Gurney, Jamestown, N. Y., assignors to W. & L. E. Gurley, Troy, N. Y., a corporation of New York Original application May 5, 1947, Serial No. 745,930, now Patent No. 2,570,568, dated October 9, 1951. Divided and this application July 27, 1950, Serial No. 176,232

2 Claims. (Cl. 308—174)

This invention relates to surveying instruments and particularly to the so-called spindle bearing which defines the vertical geometrical axis of the instrument.

The present application is a division of our application Serial No. 745,930, now Patent No. 2,570,568, and the benefit of the filing date of that application, May 5, 1947, is claimed.

Since the problem is to produce a precise bearing on which the telescope turns, it is simpler to explain the invention as embodied in a level. The invention can, however, be used in connection with more complicated instruments, such as transits and theodolites. The added complication in connection with instruments of the types just mentioned arises from the presence of a second and coaxial bearing which supports the horizontal limb. Since that second bearing is not involved in the present invention, nothing is sacrificed by disclosing the invention as used in a level.

According to the present embodiment of the invention both bearings are of the preloaded, cylindrical-race type. Within narrow limits a bearing so constructed is indifferent to misalignment. A thrust bearing is required and takes a simple form which is practically friction-free.

From a manufacturing standpoint, the problem in producing a precise spindle bearing of the ball type involves the production of truly coaxial races at the top and bottom of the spindle and at the top and bottom of the bearing sleeve. As will be explained fully hereinafter, the commercial importance of the present invention resides in the design of the races so that they can be made truly coaxial by simple manufacturing processes. The importance of these considerations is reflected in the fact that no adjustment is needed. Precision turns solely on accuracy of manufacture, and is limited only by the precision with which bearing balls can be produced.

The invention will now be described by reference to the accompanying drawing in which the single figure is a view, chiefly in vertical axial section, through a leveling head constructed according to the invention.

The usual base plate is indicated at 6. This plate is intended to be mounted on a tripod not shown in the drawing. The base 6 has the usual central aperture with a bushing 7, affording the usual concave spherical bearing seat for the spherical head 8. This is formed on a nut 9. The nut 9 is threaded at 11 upon the tubular bearing sleeve 12. The threads 11 engage the sleeve 12 in an area above the lower end of the sleeve and above the lower internal bearing race hereinafter described. Sleeve 12 has at its upper end an external enlargement 13 which surrounds the upper bearing race and affords an external shoulder 14 some distance below this race. A spacing sleeve 15 surrounds the sleeve 12 and engages the shoulder 14. The sleeve 15 engages the top of the cruciform leveling head 16 while the nut 9 engages the lower side thereof. In this way the bearing sleeve 12, the sleeve 15 and the leveling head 16 are locked together by the nut 9 and so form a unitary structure. The stress exerted by the nut is so localized that there is no tendency to deform the sleeve 12. On the contrary, the sleeve is simply stressed in tension.

Pursuant to this same idea, the sleeve 15 has at its top a cylindrical extension 17, which is spaced from the head 13 on the sleeve 12 and is shouldered to receive and support the clamp 18, forming a part of a tangent screw mechanism, not illustrated in detail. The significant aspect of the construction is that the clamp 18 may be engaged and released without devoloping distorting stresses in the bearing sleeve 12. This follows from the fact that the clamp engages only the sleeve 15 and only that portion of that sleeve which is spaced from the sleeve 12.

The arms of the leveling head 16 are provided with the usual leveling screws 19, each of said screws having a universally mounted thrust head 21 which engages the upper surface of the base plate 6.

The lower end of the nut 9, i. e. the end below the spherical head 8, is closed by a screw plug 22.

The sleeve 12 has a straight cylindrical bore 24 which is highly precise and is produced by grinding, lapping and honing to the desired finished diameter. A spindle 25 below the flange 27 is a precisely formed true cylinder of uniform diameter except for the retaining groove hereinafter described. The spindle 25 is attached by means of threads 34 to the frame of the level.

The bore of sleeve 12 serves as the outer race for balls mounted between it and the spindle 25 under preload. The upper balls 28 are spaced by an apertured retainer 35. The lower series of balls 31 are spaced by an apertured retainer 32. A ball 36 mounted in a socket formed in the lower end of the spindle 25 at the axis of the spindle serves as a thrust bearing and engages the plug 37 which is screwed into the lower open end of the sleeve 12. To maintain the parts in assembled relation a screw 38 is threaded into the sleeve 12 and carries at its end a stem which enters a groove 39 encircling the spindle 25.

Thus, the embodiment of the invention claimed in the present application has two preloaded radial bearings each with cylindrical races. This structure makes it necessary to use the thrust ball 36 because the radial bearings do not resist thrust.

The parent application gives certain dimensions which relate to a slightly different embodiment of the invention but which are indicative of the degree of preloading desired and the dimensions used to secure it. In that example, the outer race is ground, lapped and honed to a diameter of 0.7501±0.000025. The inner race is similarly precisely finished to a diameter of 0.4378±0.000025. The diameter of the balls is 0.15625±0.000011. Consequently the balls are under a compression amounting to 0.0001. This strain is well within the elastic limit of the ball and assures precise support of the spindle within the bearing sleeve. It would be possible to preload the balls even more highly but the suggested preloading is sufficient.

It is important to observe that a preloaded ball bearing having two cylindrical races is practically indifferent to alignment within a minute angular displacement of the spindle which could be caused by inaccuracies of manufacture. Misalignment has the effect of converting the ball path from a circle to an ellipse but if the angle of misalignment is small and it cannot be large in this case, the difference between the major and minor axes of the ellipse is infinitesimal and much less than the degree of preloading. As a consequence it can have no material effect. Thus, the construction shown in the present application is indifferent to misalignment of that degree which could possibly occur in commercial practice.

Another important feature of the device is the fact that the outer sleeve 12 is stressed only in tension developed strictly in the direction of its geometrical axis, which of course is an axis of symmetry. Also the ends of sleeve 12 project beyond the engagement of nut 9 and the plane of engagement of shoulder 14, and the bearing races are located in these projecting portions. As a consequence any tendency toward distortion of sleeve 12 is minimized. Furthermore, the races are located in portions of the sleeve substantially unaffected by such distortion as might conceivably occur.

We claim:
1. A vertical spindle bearing structure for use in surveying instruments comprising in combination a rotatable vertical cylindrical spindle; a normally fixed encircling coaxial sleeve having a cylindrical bore; two longitudinally spaced bearings interposed each between the spindle and the sleeve, each bearing comprising a single circular series of balls encircling the spindle and confined between the cylindrical surfaces of the spindle and of the bore of the sleeve, the balls being so dimensioned relatively to the spindle and sleeve that the balls are confined under a degree of loading less than the elastic limit of the balls; retainer means serving to space said balls in two circular series; and a thrust bearing arranged to react on said spindle, at and in the direction of its axis.

2. A vertical spindle bearing structure for use in surveying instruments comprising in combination a rotatable vertical cylindrical spindle; a normally fixed encircling coaxial sleeve having a cylindrical bore; two longitudinally spaced bearings interposed each between the spindle and the sleeve, each bearing comprising a circular series of balls encircling the spindle and confined between the cylindrical surfaces of the spindle and of the bore of the sleeve, the balls being so dimensioned relatively to the spindle and sleeve that the balls are confined under a degree of loading less than the elastic limit of the balls; retainer means serving to space said balls in two circular series; a thrust bearing arranged to react on said spindle, at and in the direction of its axis; and supporting means arranged to engage said sleeve and stress it axially in tension between planes each of which is spaced from and located between the planes of the two circular series of balls.

HAROLD R. LARSEN.
DANIEL GURNEY.

REFERENCES CITED

The following references are of record in the file of this patent:

FOREIGN PATENTS

| Number | Country | Date |
|---|---|---|
| 234,045 | Great Britain | July 23, 1925 |